US011144405B2

(12) United States Patent
Bikumala et al.

(10) Patent No.: US 11,144,405 B2
(45) Date of Patent: Oct. 12, 2021

(54) OPTIMIZING DATABASE MIGRATION IN HIGH AVAILABILITY AND DISASTER RECOVERY COMPUTING ENVIRONMENTS

(71) Applicant: Dell Products L. P., Round Rock, TX (US)

(72) Inventors: Sathish Kumar Bikumala, Round Rock, TX (US); Sridevi Chinnasamy, Bangalore (IN)

(73) Assignee: Dell Products L.P., Round Rock, TX (US)

(*) Notice: Subject to any disclaimer, the term of this patent is extended or adjusted under 35 U.S.C. 154(b) by 668 days.

(21) Appl. No.: 15/803,048

(22) Filed: Nov. 3, 2017

(65) Prior Publication Data
US 2019/0138402 A1 May 9, 2019

(51) Int. Cl.
| | |
|---|---|
| *G06F 11/14* | (2006.01) |
| *G06F 21/60* | (2013.01) |
| *H04L 9/06* | (2006.01) |
| *G06F 11/20* | (2006.01) |
| *G06F 16/21* | (2019.01) |

(Continued)

(52) U.S. Cl.
CPC ...... *G06F 11/1466* (2013.01); *G06F 11/1469* (2013.01); *G06F 11/2056* (2013.01); *G06F 16/214* (2019.01); *G06F 21/602* (2013.01); *G06F 21/6218* (2013.01); *G06F 21/6227* (2013.01); *H04L 9/06* (2013.01); *H04L 9/065* (2013.01); *H04L 9/0631* (2013.01); *H04L 9/16* (2013.01); *G06F 11/1464* (2013.01)

(58) Field of Classification Search
CPC . G06F 11/1466; G06F 16/214; G06F 11/1469
USPC ........................................................ 707/640
See application file for complete search history.

(56) References Cited

U.S. PATENT DOCUMENTS

| | | | |
|---|---|---|---|
| 10,108,497 B1 * | 10/2018 | Chockalingam | ............................ G06F 16/24575 |
| 2016/0162371 A1* | 6/2016 | Prabhu | ................. G06F 11/1461 707/654 |
| 2016/0300223 A1* | 10/2016 | Grey | ................... G06Q 20/3825 |

(Continued)

OTHER PUBLICATIONS

Lin, Cephas et al., "Microsoft® SQL Server® 2012"; Migration Guide: Migrating to SQL Server 2012 Failover Clustering and Availability Groups from Prior Clustering and Mirroring Deployments. Part I—Prescriptive Guidance; Mar. 2012; 14 pages.

(Continued)

*Primary Examiner* — Allen S Lin
(74) *Attorney, Agent, or Firm* — Krishnendu Gupta; Deepika Bhayana; Dorothy Wu Chiang

(57) ABSTRACT

Disclosed herein are methods, systems, and processes to optimize migration of databases in high availability and disaster recovery (HADR) computing environments. An endpoint associated with a new primary database server is modified to be compatible with a first encryption mechanism and a second encryption mechanism. Database mirroring between an old primary database server and an old secondary database server is disabled, and database mirroring is configured between the old primary database server and the new primary database server. A failover operation is performed by migrating one or more databases from the old primary database to the new primary database, and database mirroring between the old primary database server and the new primary database server is disabled.

15 Claims, 10 Drawing Sheets

(51) Int. Cl.
*G06F 21/62* (2013.01)
*H04L 9/16* (2006.01)

(56) References Cited

U.S. PATENT DOCUMENTS

2017/0060699 A1* 3/2017 Hohl ..................... G06F 16/27
2017/0220431 A1* 8/2017 Joshi .................. G06F 11/2028

OTHER PUBLICATIONS

Microsoft Docs; "Validate Hardware for a Failover Cluster"; Mar. 9, 2017; 18 pages.https://docs.microsoft.com/en-us/previous-versions/windows/it-pro/windows-server-2012-R2-and-2012/jj134244(v=ws.11)?redirectedfrom=MSDN.

* cited by examiner

OPTIMIZING DATABASE MIGRATION IN HIGH AVAILABILITY AND DISASTER RECOVERY COMPUTING ENVIRONMENTS

FIELD OF THE DISCLOSURE

This disclosure relates to database migration. In particular, this disclosure relates to optimizing migration of databases in high availability and disaster recovery (HADR) computing environments.

DESCRIPTION OF THE RELATED ART

A database is an organized collection of data. Relational database management systems (RDBMS) manage mission critical data (e.g., for electronic commerce, financial institutions, and the like) and are implemented on servers configured with high availability and disaster recovery (HADR) solutions (e.g., Mirroring, AlwaysOn, and the like). High availability and disaster recovery can be used to ensure continuous availability, disaster recovery, data access, and data integrity, but for distinct reasons.

High availability is a process in which a secondary computing system is configured to take over when a primary computing system stops working efficiently or ceases to work altogether. High availability solutions attempt to provide minimum downtime and negligible data loss, and can be configured to account for computing tasks such as scheduled maintenance, peak usage times, upgrades, minor outages, and the like.

Disaster recovery on the other is also concerned with downtime and data security, but unlike high availability, focuses on potentially longer outages beyond the normal and/or expected recovery point objective (RPO) and recovery time objective (RTO). Therefore, unlike high availability, which deals with planned and/or minor computing events, disaster recovery deals with unscheduled events with potentially long lasting consequences.

Given their different roles, disaster recovery and high availability are not mutually exclusive. For example, high availability strives for day-to-day continuity under normal operating conditions (e.g., by configuring and implementing fault-tolerant computing systems). On the other hand, disaster recovery is much more urgent—if mission critical computing systems go down, when backup computing systems are unexpectedly unavailable, and/or when data is compromised (e.g., from a cyber breach incident), typical computing systems cannot restore normal operations on their own. Therefore, high availability is akin to a technology configuration whereas disaster recovery is a program and a strategy.

Consequently, companies and businesses typically implement both high availability and disaster recovery (HADR) solutions in database computing environments to realize the benefits and protections of both methodologies. As noted, server clusters can be configured with both high availability and disaster recovery solutions such as Mirroring and AlwaysOn, respectively (in addition to various other HADR solutions). Unfortunately, complexity in the computing architecture of these databases and servers in addition to the unavailability of an efficient database migration method for such HADR computing environments can cause significant downtime, resulting in revenue loss for companies and businesses.

SUMMARY OF THE DISCLOSURE

Disclosed herein are methods, systems, and processes to optimize migration of databases in high availability and disaster recovery (HADR) computing environments. One such method includes modifying an endpoint associated with a new primary database server to be compatible with a first encryption mechanism and a second encryption mechanism, disabling database mirroring between an old primary database server and an old secondary database server, configuring the database mirroring between the old primary database server and the new primary database server, performing a failover operation by migrating one or more databases from the old primary database to the new primary database, and disabling the database mirroring between the old primary database server and the new primary database server. In this example, the first encryption mechanism is an Advanced Encryption Standard (AES), and the second encryption mechanism is a Rivest Cipher 4 (RC4).

In some embodiments, the method includes configuring always on availability group between the new primary database server and a new secondary database server, determining that the endpoint indicates the first encryption mechanism and the second encryption mechanism, generating a full backup of the old database and at least one log backup, and restoring the old database and the log backup on the new primary database server to facilitate the database mirroring.

In other embodiments, the method includes simultaneously configuring the database mirroring from the old primary database server to the new primary database server for data synchronization and the always on availability group from the new primary database server to the new secondary database server to minimize changes to the data.

In one embodiment, and as part of the migrating, the method involves simultaneously changing a connection string of an application from the old primary database server to the new secondary database server so as to require a single connection string change. In another embodiment, the method involves generating a full backup of one or more databases and corresponding database logs from the new primary database server, and restoring the one or more databases and the corresponding logs on the new secondary database server.

In certain embodiments, the method involves configuring the always on availability group for the old database and the new database between the new primary database server and the new secondary database server, and configuring one or more endpoints in the new primary database server to use both the first encryption mechanism and the second encryption mechanism to facilitate the database mirroring and the always on availability group.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
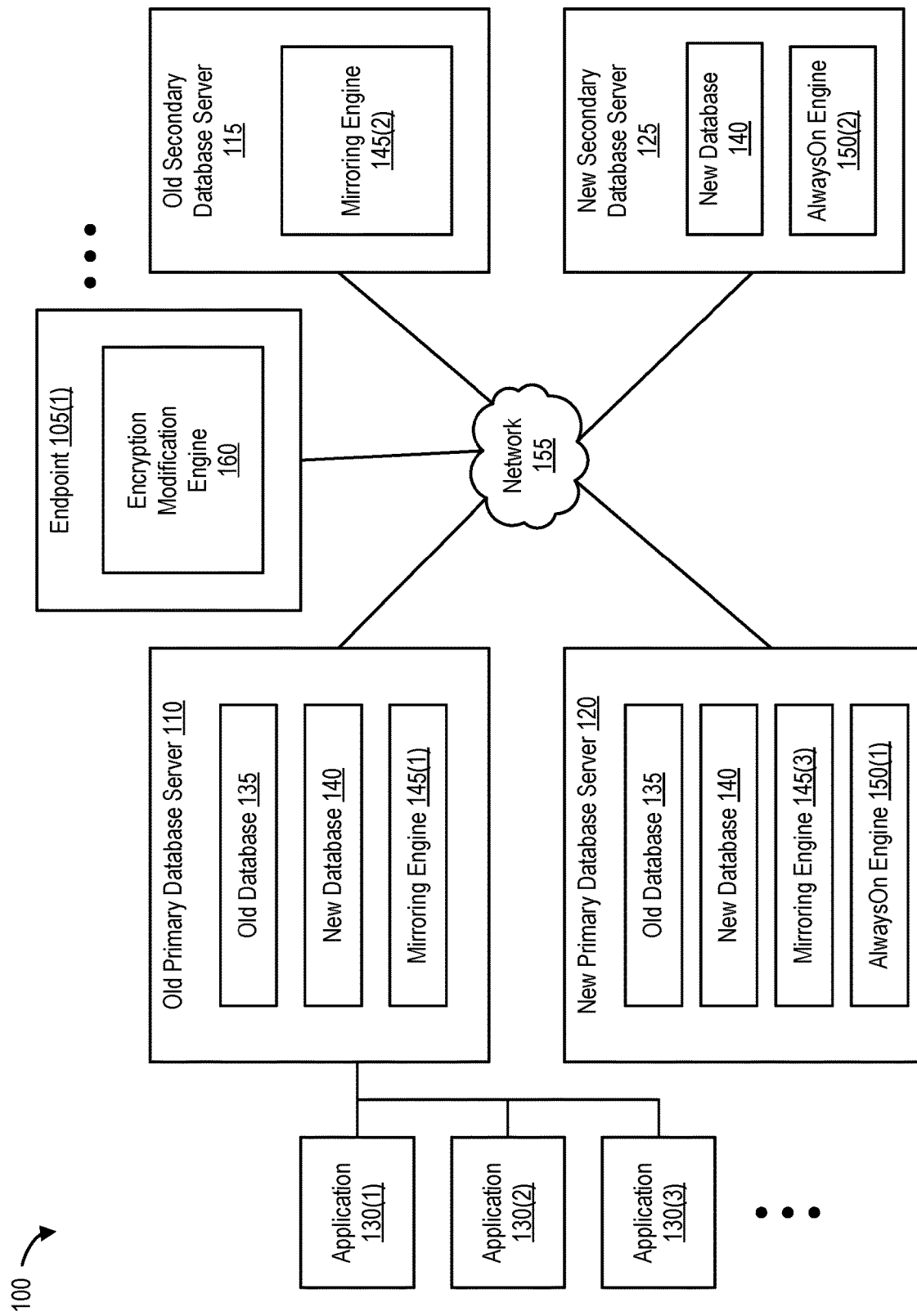
FIG. 1 is a block diagram 100 of databases implemented in a high availability and disaster recovery (HADR) computing environment, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A database is a data structure, managed by a database management system (DBMS) program that organizes a collection of data. Companies, businesses, and/or organizations use various databases and database applications to manage and provision mission critical data (e.g., to facilitate electronic commerce, financial transactions, and the like). Because databases manage mission critical data, they are typically implemented on database servers configured with high availability and disaster recovery (HADR) solutions (e.g., Mirroring, AlwaysOn, and the like) to ensure continuous availability, data access, and data integrity.

Database mirroring (or simply, mirroring) increases database availability by supporting failover. Mirroring can be used to maintain a single standby database (also referred to as a mirror database) for a corresponding production database (also referred to as a principal database). The mirror database is created by restoring a database backup of the principal database with no recovery, thus making the mirror database inaccessible to clients. However, a database snapshot of the mirror database can provide clients with read-only access to the data in the database as it existed when the snapshot was created.

A typical database mirroring configuration involves a primary server that contains the principal database, and a mirror server (also referred to as a secondary server) that contains the mirror database. The mirror server continuously brings the mirror database up to date with the principal database. In this configuration, if the primary server goes down and/or is lost, the mirror (or secondary) server can be used as a standby server that supports failover.

Database mirroring offers substantial availability and provides an efficient alternative to other high availability solutions such as failover clustering and log shipping. When a database mirroring session is synchronized (e.g., when a transaction is committed on both the primary and mirror databases), database mirroring provides a "hot" standby server that supports efficient and timely failover. If a production server fails, applications can recover by reconnecting to the secondary/standby server.

One alternative or addition to database mirroring can involve the implementation of HADR solutions such as availability groups (e.g., AlwaysOn, and the like) that allow for improved cross-database referencing during failover (as opposed to traditional mirroring which can only be implemented for a single database). An availability group supports a replicated computing environment for a discrete set of user databases (also referred to as availability databases). An availability group is a group of databases that fail over together. An availability group supports at least one set of primary databases and multiple sets of corresponding secondary databases. An availability group fails over at the level of an availability replica. Failovers are not caused by database issues such as a database becoming suspect due to a loss of a data file, deletion of a database, or corruption of a transaction log. Therefore, availability groups maximize the availability of a set of databases.

As previously noted, disaster recovery and high availability are not mutually exclusive. Data mirroring and availability groups can be implemented together in a single clustered computing environment. Unfortunately, migrating (and restoring) databases implemented on mission critical database servers configured with both high availability (HA) (e.g., mirroring, and the like) and HADR solutions (e.g., AlwaysOn, and the like) presents a technology-based challenge due to the complexity of such clustered environments.

For example, performing database migration in clustered environments that implement both HA and HADR solutions is challenging and problematic from a technical perspective at least for the following reasons. First, addition of new nodes to a cluster may be required during migration, which would further require a full validation test causing significant downtime. Second, if the hardware and/or operating system (OS) is end-of-life (EOL), modifying cluster configurations can be extremely risky because doing so could lead to unexpected cluster behavior rendering service restoration unpredictable. Third, adding or removing nodes multiple times in a cluster may require the reconfiguration of a quorum—a limiting requirement to say the least. Fourth, database migration in such hybrid HA and HADR computing environments requires the configuration of availability groups during the migration window, giving rise to the risk of a protracted migration process or even the need to rollback. Fifth, database migration in such hybrid HA and HADR computing environments also requires multiple changes in connection string during migration, leading to downtime. Sixth, multiple changes to an HA solution (e.g., mirroring) could render the database unrecoverable, leading to data loss and data corruption. Therefore, making changes to the cluster, to the database servers, to the database, and/or to the configurations of the HA and/or HADR solutions during migration is complicated from a technical standpoint due to the risk of significant downtime, rollback, and the like.

Disclosed herein are methods, systems, and processes to optimize the migration of databases implemented on servers in hybrid HA and HADR computing environments.

Example High Availability and Disaster Recovery (HADR) Computing Systems

FIG. 1 is a block diagram 100 of databases implemented in a high availability and disaster recovery (HADR) computing environment, according to one embodiment. As shown in FIG. 1, an old primary database server 110, an old secondary database server 115, a new primary database server 120, a new secondary database server 120, and an endpoint 105(1) are communicatively coupled via network 155. Old primary database server 110, old secondary database server 115, new primary database server 120, new secondary database server 120, and endpoint 105(1) can each be any of a variety of different types of computing devices, including a server, personal computing device, laptop computer, net book, personal digital assistant, cellular phone, or the like. Network 155 can be a local area network (LAN), a Wide Area Network (WAN, a Storage Area Network (SAN), the Internet, and the like, (or any other appropriate network and/or interconnection).

Old primary database server 110 provisions databases to applications 130(1)-(3) and includes at least an old database 135, a new database 140, and a mirroring engine 145(1). In this example, old database 135 and new database 140 are different. For example, new database 140 may be an upgraded and/or new version of old database 135. Mirroring engine 145(1), in association and/or in conjunction with a mirroring engine 145(2), which is implemented in old secondary database server 115, provides database mirroring to one or more databases implemented by old primary database server 110.

New primary database server 120 implements old database 135, new database 140, a mirroring engine 145(3), and an AlwaysOn engine 150(1). New secondary database server 125 implements new database 140 and an AlwaysOn engine 150(2). AlwaysOn engine 150(1) and AlwaysOn engine 150(2) provide availability group-based HADR solution(s) to the computing system shown in FIG. 1.

Endpoint 105(1), as shown in FIG. 1, implements encryption modification engine 160. Endpoint 105(1) can be implemented separately (as shown in FIG. 1), or by database servers (e.g., by new primary database server 120). Endpoint 105(1) is a computing device or a node that is connected to a network such as a LAN or a WAN (e.g., network 155) and accepts communications back and forth across the network. In some embodiments, endpoint 105(1) can be a modem, a hub, a bridge, or a switch. In other embodiments, endpoint 105(1) can be a data terminal equipment (e.g., a digital telephone handset, a router, a printer, and the like), or a host computer (e.g., a workstation, a server, and the like). In some examples, endpoint 105(1) can be any computing device outside a corporate firewall (e.g., a laptop, a table, a mobile phone) on the "edge" (or periphery) of the network.

Encryption modification engine 160 permits the altering and/or modification of listener endpoints (e.g., Hadr_endpoint) of database servers from an existing encryption methodology applicable to the HA solution (e.g., Advanced Encryption Standard (AES) used by AlwaysOn) to two (or more) encryption methodologies that can be used co-extensively before, during, or after database migration in the hybrid HA and HADR computing environment shown in FIG. 1 (e.g., Rivest Cipher 4 (RC4) for mirroring and AES for AlwaysOn).

In certain embodiments, one or more computing devices shown in FIG. 1 enable pre-configuration of new servers with settings including configuring an OS cluster, implementing HA and/or HADR solution(s), and other configurations that are necessary to access live production data without disrupting an existing set of production servers (or their cluster). In this manner, cluster configuration can be performed, failover/failback can be tested, and applications can test their connectivity (e.g., to ensure that servers are production ready).

Example of Performing Database Migration in Hybrid HA & HADR Environments

In one embodiment, before database migration is initiated, mirroring engines 145(1) and/or 145(2) break (or remove) mirroring between existing production servers (e.g., the database mirroring between old primary database server 110 and old secondary database server 115). Mirroring engines 145(1) and/or 145(3) then configure (or setup) mirroring from a current production primary server (e.g., old primary database server 110) to a new production primary server (e.g., new primary database server 120). Unfortunately, mirroring and availability groups (e.g., AlwaysOn) cannot be setup in the same server because endpoints configured for these servers use different encryption algorithms. For example, endpoint 105(1) associated with old primary database server 110, which implements mirroring, can use RC4, whereas endpoint 105(2) associated with new primary database server 120, which implements AlwaysOn, can use AES. Therefore, in some embodiments, encryption modification engine 160 alters and/or modifies one or more endpoints to use both AES and RC4, or permits encryption to be disabled for the duration of the migration. In this example, even if encryption is disabled, data is cryptographically signed (e.g., using a keyed-hash message authentication code (HMAC)) and data security is ensured because traffic signing cannot be turned off.

It will be appreciated that altering and/or modifying an endpoint in this manner permits a database to be configured with mirroring for data flow from the current production primary server (e.g., old primary database server 110) to the new production primary server (e.g., new primary database server 120), while simultaneously permitting the new production primary server (e.g., new primary database server 120) to be configured with availability groups (e.g., an AlwaysOn availability group configured by AlwaysOn engine 150(1)). When an application is ready to utilize the new production primary server, mirroring between the old and the new production primary servers is broken, and the database(s) are brought online on the new production primary server.

In certain embodiments, clients (e.g., clients that execute applications 130(1)-(3)) can connect to the new production primary server using a listener (also referred to as an endpoint listener) as long as the database(s) reside in a primary server whose listener internet protocol (IP) is online, even though the database(s) brought online on the new production primary server are not yet part of an availability group. In this example, a listener is a virtual IP that permits client connectivity to and from various nodes. In other examples, a listener receives requests from service requester applications within a specific application server or cluster. In these examples, the listener is the point (address)

at which messages for a web service are received by a service integration bus and supports a particular binding.

In some embodiments, after clients can begin connecting to the new production primary server using the listener, databases are added to an availability group (e.g., an AlwaysOn availability group) with a copy in the secondary replica. Performing database migration in this manner requires changing of an application connection string (or simply, connection string) only once without requiring additional configuration changes on the new production primary server (e.g., on new primary database server 120).

Figure 2:
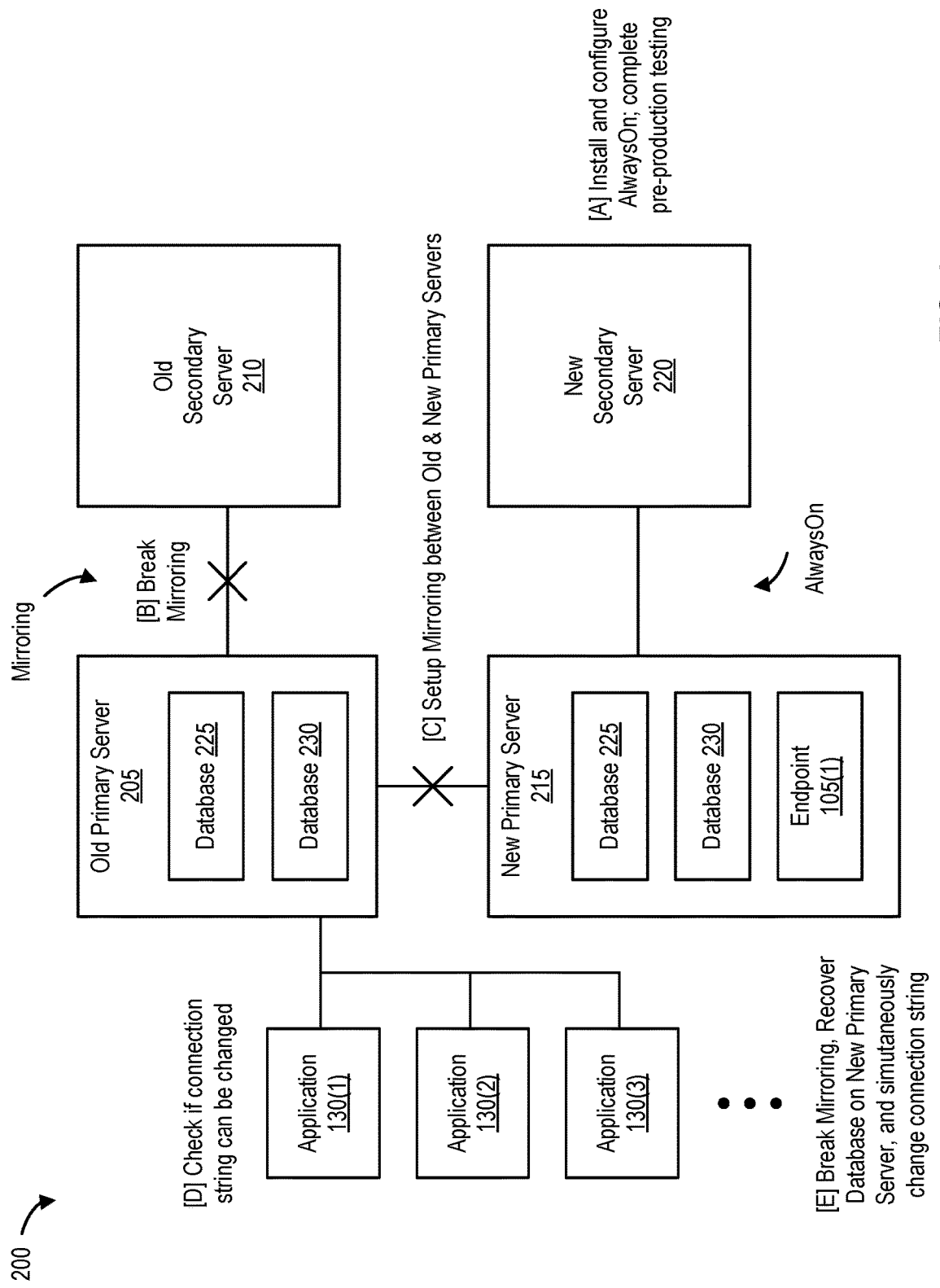
FIG. 2 is a block diagram 200 of database servers configured with HADR solutions, according to one embodiment of the present disclosure.

FIG. 2 is a block diagram 200 of database servers configured with HADR solutions, according to one embodiment. The computing systems of FIG. 2 can be used to optimize database migration in hybrid HA and HADR computing environments. FIG. 2 illustrates an old primary server 205, an old secondary server 210, a new primary server 215, and a new secondary server 220. Old primary server 205 includes databases 225 and 230, and services application 130(1)-(N). New primary server 215 includes databases 225 and 230, as well as endpoint 105(1). In this example, old primary server 205 and old secondary server 210 are configured with Mirroring and new primary server 215 and new secondary server 220 are configured with AlwaysOn. As shown in FIG. 2, at least five (5) steps can be implemented in a database migration process to achieve near zero downtime during database migration in hybrid HA and HADR computing environments.

In certain embodiments, Step [A] involves installing and configuring AlwaysOn (or another availability group solution) and completing pre-production testing (e.g., failover/failback testing, application connectivity testing, and the like). Step [B] involves breaking mirroring between old primary server 205 and old secondary server 210 (e.g., between the original primary and secondary/DR servers). Step [C] involves setting up mirroring between old primary server 205 and new primary server 215 (e.g., between the old and new primary servers). Step [D] involves determining if the connection string between application 130(1) and old primary server 205 can be broken. And Step [E] involves breaking mirroring, recovering the database on new primary server 215, and simultaneously changing the connection string.

Figure 3A:
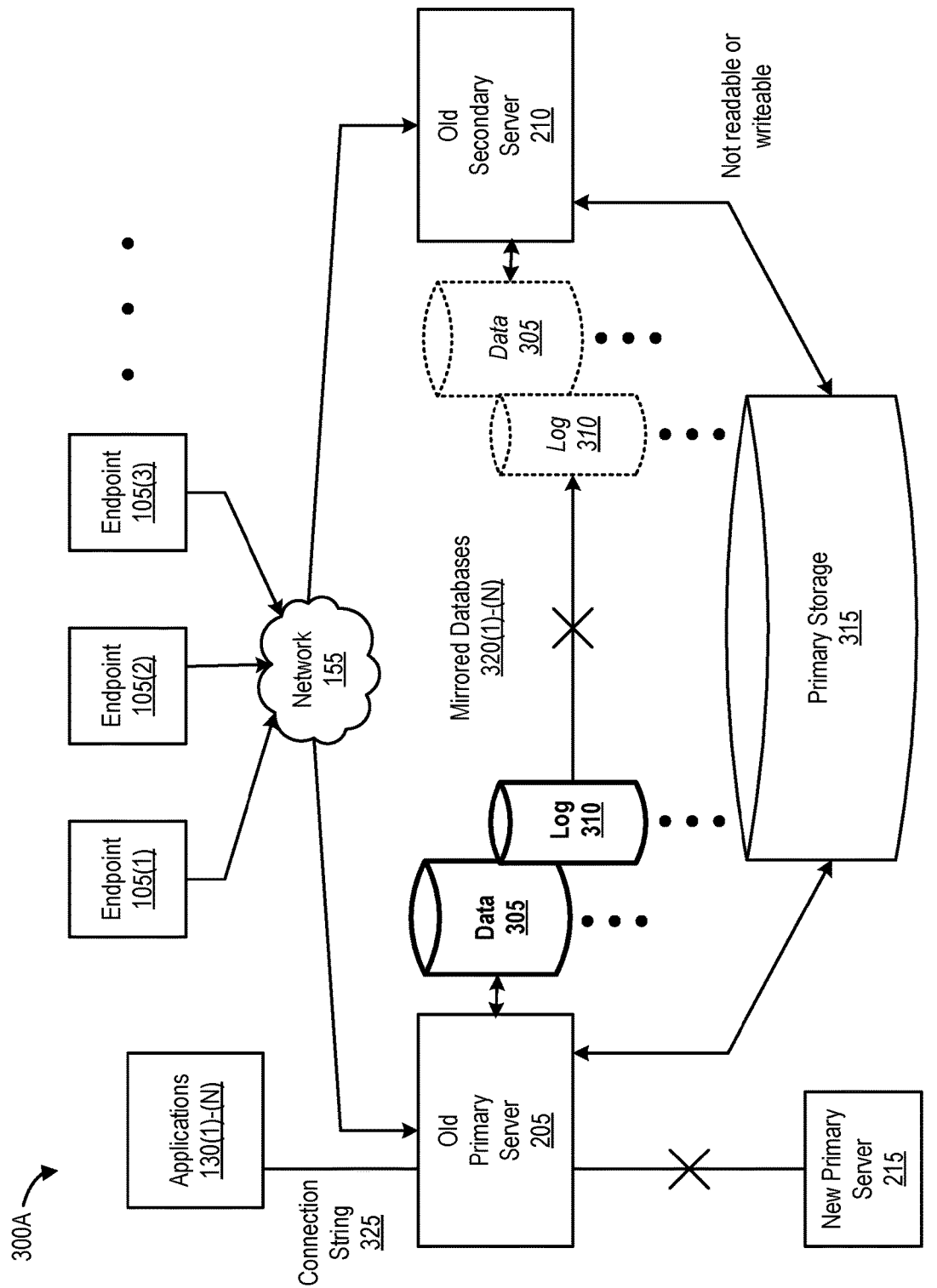
FIG. 3A is a block diagram 300A of database servers implementing high availability mirrored databases, according to one embodiment of the present disclosure.

FIG. 3A is a block diagram 300A of database servers implementing high availability mirrored databases, according to one embodiment. As shown in FIG. 3A, old primary server 205 services applications 130(1)-(N) and includes mirrored databases 320(1)-(N) (data managed by databases 320(1)-(N) is shown as data 305 (with a corresponding log 310)). Because old secondary server 210 maintains a mirrored database in a mirroring HA configuration, both old primary server 205 and old secondary server 210 are coupled to a primary storage 315 but old secondary server 210 cannot read or write to primary storage 315 (e.g., because mirrored databases cannot be read). As shown in FIG. 3A, one or more endpoints 105(1)-(N) are associated with old primary server 205 and/or new primary server 215 and, in this example, are communicatively coupled to old primary server 205 via network 155. Applications 130(1)-(N) also include connection string 325. A connection string can be stored as a key/value (KV) pair in an application configuration file. The connection string permits the application (or multiple applications) to access data maintained by databases in old primary server 205, and upon and/or after migration, new primary server 215.

Figure 3B:
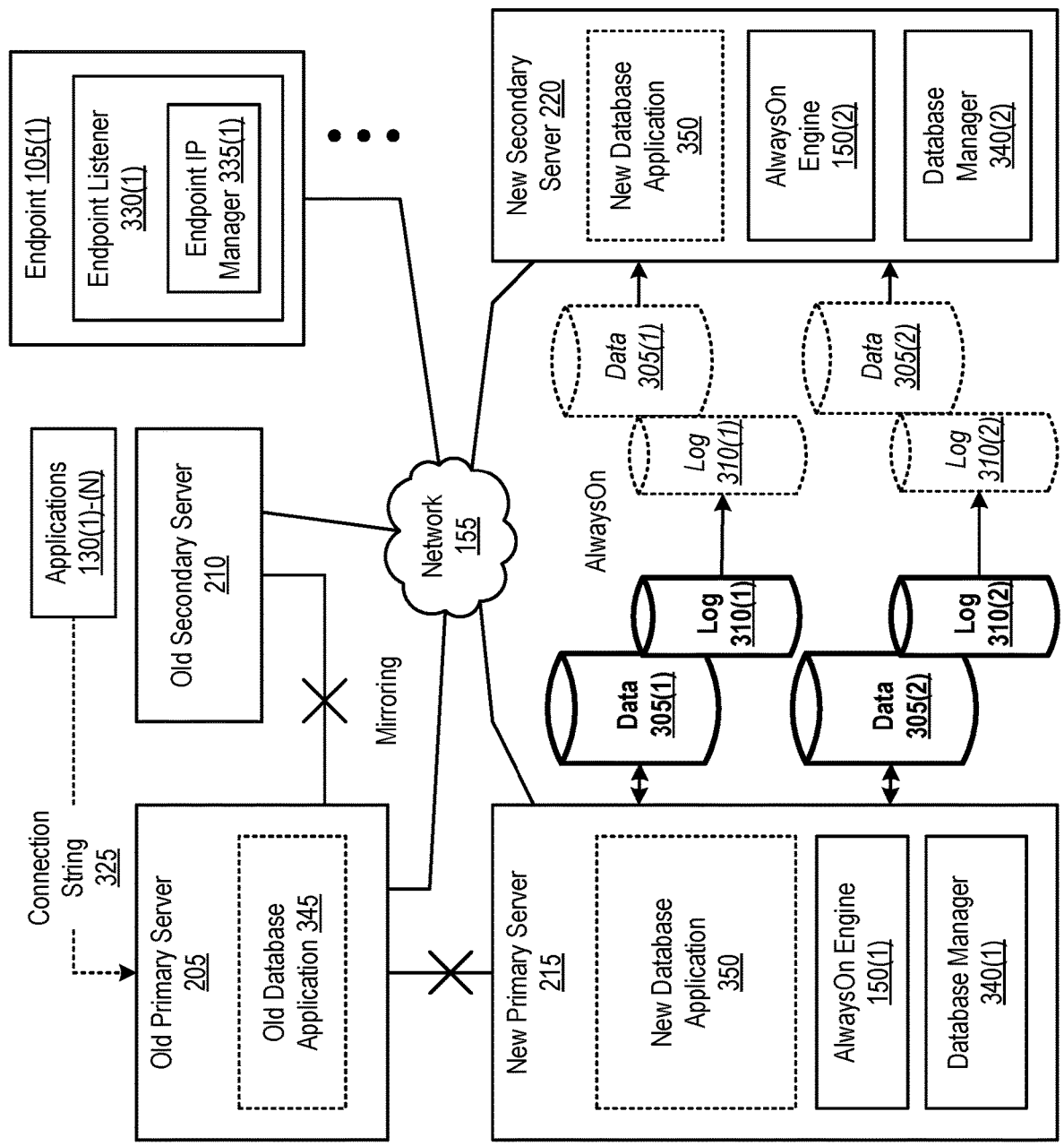
FIG. 3B is a block diagram 300B of database servers implementing mirrored and AlwaysOn databases, according to one embodiment of the present disclosure.

FIG. 3B is a block diagram 300B of database servers implementing mirrored and availability group databases, according to one embodiment. The computing system of FIG. 3B provides a mirrored HA solution as well as an AlwaysOn HADR solution. AlwaysOn provides a "hot" standby for primary server 215 and duplicate data for databases, and includes at least two separate servers and databases (e.g., new primary server 215 and new secondary server 220). Each server and data storage is provisioned separately from the other server and data storage. Each server (e.g., new primary server 215 and new secondary server 220) includes a separate installation of a DBMS (e.g., new database application 350) installed as a clustered instance. Once each clustered node is ready, new database application 350 creates an availability group connecting new primary server 215 and new secondary server 220.

Next, each database to be protected is added to the availability group. Each of these database(s) is backed up on new primary server 215 and restored to new secondary server 220. When restored, the database(s) are left in the recovering mode which enables additional transactions from new primary server 215 to be inserted into new secondary server 220, while leaving new secondary server 220 in a readable mode. Unlike mirroring where mirrored databases cannot be read and only one database can be in a mirror, leaving a secondary database in readable mode permits multiple copies of a primary database. When transactions are sent to each primary database's log file, the transactions are copied to the secondary database's log file, thus ensuring that the secondary database is kept in sync with the primary database.

In one embodiment, a database is created on new primary server 215 (e.g., new database 140), full and log backups of the database are generated, and an availability group is configured. In another embodiment, the listener endpoint (e.g., Hadr_endpoint) of endpoint listener 330(1) is altered and/or modified by endpoint IP manager 335(1) and/or encryption modification engine 160 from a first encryption method (e.g., AES) to a first and second encryption method (e.g., AES RC4) to support mirroring from old primary server 205 (e.g., RC4) and to support the availability group (e.g., AES). In this example, endpoint 105(1) is checked to determine whether both encryption methods, algorithms, and/or techniques have been enabled (e.g., the description of the encryption algorithm should indicate AES RC4).

In some embodiments, database manager 340(1) generates a full backup and at least one log backup of databases from old primary server 205 and restores the databases on new primary server 215, with no recovery. Next, mirroring is broken or removed between old primary server 205 and old secondary server 210, and (mirroring) is setup or configured between old primary server 205 and new primary server 215 (e.g., between old database application 345 and new database application 350). In other embodiments, once an application load stops and a determination is made that the databases are synchronized, mirroring is broken or removed between old database application 345 and new database application 350, and new database 140 is restored with recovery by new database application 350. The application (e.g., application 130(1)) is then permitted to connect to new database application 350 using listener even before joining the new database 140 in the availability group.

In certain embodiments, database and log backups are generated of databases from new primary server 215 and restored on new secondary server 220 with no recovery. AlwaysOn is configured for database 225 and database 230 between new primary server 215 and new secondary server 220. If needed, additional databases are then migrated from old database application 345 to new database application

350. Because neither RC4 nor AES can alone permit both mirroring and an availability group, it will be appreciated that altering the endpoint from AES to AES RC4 allows both mirroring (e.g., from old database application 345 to new database application 350) and AlwaysOn (e.g., between new primary server 215 and new secondary server 220). Finally, endpoint(s) in new primary server 215 are altered or modified to use AES after the remaining databases have been migrated from old database application 345 to new database application 350.

The following illustrates an embodiment of an example migration process flow for encryption modification engine 160, mirroring engine 145, and/or AlwaysOn engine 150:

```
//Step1 Create a database on SQL2k16Srv1
    :connect SQL2k16Srv1
    Use Master
    GO
    Create database AGLTest
//Step2 Take full and log backups of database
    :connect SQL2k26Srv1
    Backup database AGLTest to disk = 'd:\gdbms_deploy\AGLTest.bak'
    GO
    :connect SQL2k16Srv1
    Take log backup of database
    Backup Log AGLTest to disk = 'd:/gdbms_deploy\AGLTest_log.trn'
    GO
//Step3 ConfigureAlwaysOn
    :connect SQL2k16Srv1
    Run through the AlwaysOn Wizard to configure availability for database,
    AGLTest and create listener
//Step4 ALTER the listener ENDPOING [Hadr_endpoint] from AES to RC4
    : connect SQL2k16Srv1
    ALTER ENDPOINT [Hadr_endpoint]
      STATE=STARTED
      AS TCP (LISTENER_PORT = 5022, LISTENER_IP = ALL0
      FOR DATA_MIRRORING (ROLE = ALL, AUTHENTICATION =
      WINDOWS NEGOTIATE, ENCRYPTION = REQUIRED
      ALGORITHM AES RC4)
    GO
//Step5 Check Endpoint
    : connect SQL2k16Srv1
    SELECT name, state_desc, encryption_algorithm_desc FROM
    sys.database_mirroring_endpoints
    GO
    SELECT * FROM sys.tcp_endpoints;
//Step6 Generate full backup and at least one log backup of databases from SQL2k8Srv1
    and restore on SQL2k16Srv1 with NO Recovery
    : connect SQL2k8Srv1
    Backup database ProdDB1 to disk = '\\SQL2k16Srv1\backup\ProdDb1.bak' with
    compression, stats = 5
    GO
    Backup database ProdDB2 to disk = '\\SQL2k16Srv1\backup\ProdDb2.bak' with
    compression, stats = 5
    GO
    Backup log ProdDB1 to disk = '\\SQL2k16Srv1\backup\ProdDb1_log.trn' with
    compression, stats = 5
    GO
    Backup log ProdDB2 to disk = '\\SQL2k16Srv1\backup\ProdDb2_log.trn' with
    compression, stats = 5
    GO
    : connect SQL2k16Srv1
    Restore database ProdDB1 from disk = '\\SQL2k16Srv1\backup\ProdDb1.bak'
    WITH NORECOVERY
    GO
    Restore database ProbDB2 from disk = '\\SQL2k16Srv1\backup\ProdDb2.bak'
    WITH NO RECOVERY
    GO
    Restore log ProdDB1 from disk = '\\SQL2k16Srv1\backup\ProdDb1_log.trn'
    WITH NO RECOVERY
    GO
    Restore log ProdDB2 from disk = '\\SQL2k16Srv1\backup\ProdDb2_log.trn'
    WITH NO RECOVERY
    GO
//Step7 Break mirroring between SQL2k8Srv1 and SQL2k8Srv2
    : connect SQL2k8Srv1
    ALTER DATABASE ProdDB1 SET PARTNER OFF
    GO
    ALTER DATABASE ProdDB2 SET PARTNER OFF
```

```
//Step8 Setup mirroring between SQL2k8Srv1 and SQL2k16Srv1 (between SQL 2008
   and SQL 2016)
   :connect SQL2k16Srv1
   ALTER DATABASE ProdDB1 SET PARTNER = 'TCP://
   SQL2k8Srv1.production.online.dell.com:5022'
   GO
   ALTER DATABASE ProdDB2 SET PARTNER = 'TCP://
   SQL2k8Srv1.production.online.dell.com:5022'
   :connect SQL2k8Srv1
   ALTER DATABASE ProdDB1 SET PARTNER = 'TCP://
   SQL2k16Srv1.production.online.dell.com:5022'
   GO
   ALTER DATABASE ProdDB2 SET PARTNER = 'TCP://
   SQL2k16Srv1.production.online.dell.com:5022'
   GO
//Step9 Wait for application to stop, determine databases in sync, break mirroring
   between SQL2008 and SQL 2016
   :connect SQL2k16Srv1
   ALTER DATABASE ProdDB1 SET PARTNER OFF
   GO
   ALTER DATABASE ProdDB2 SET PARTNER OFF
   GO
//Step10 Restore database with recovery on SQL16
   :connect SQL2k16Srv1
   Restore database ProdDB1 with recovery
   GO
   Restore database ProdDB2 with recovery
   GO
//Step 11 Setup AlwaysOn between new primary and new secondary servers
```

In this manner, the computing systems and/or devices of FIGS. 1, 2, 3A, and 3B can be configured to perform near zero downtime migration for mission critical Structured Query Language (SQL) databases. It will be appreciated that while applications are connected to an old production server, the data is synchronized to a new production server, thus ensuring no data loss. In addition, only a one time change in connection string for applications is required.

Processes for Performing Database Migration in Hybrid HA & HADR Environments

Figure 4:
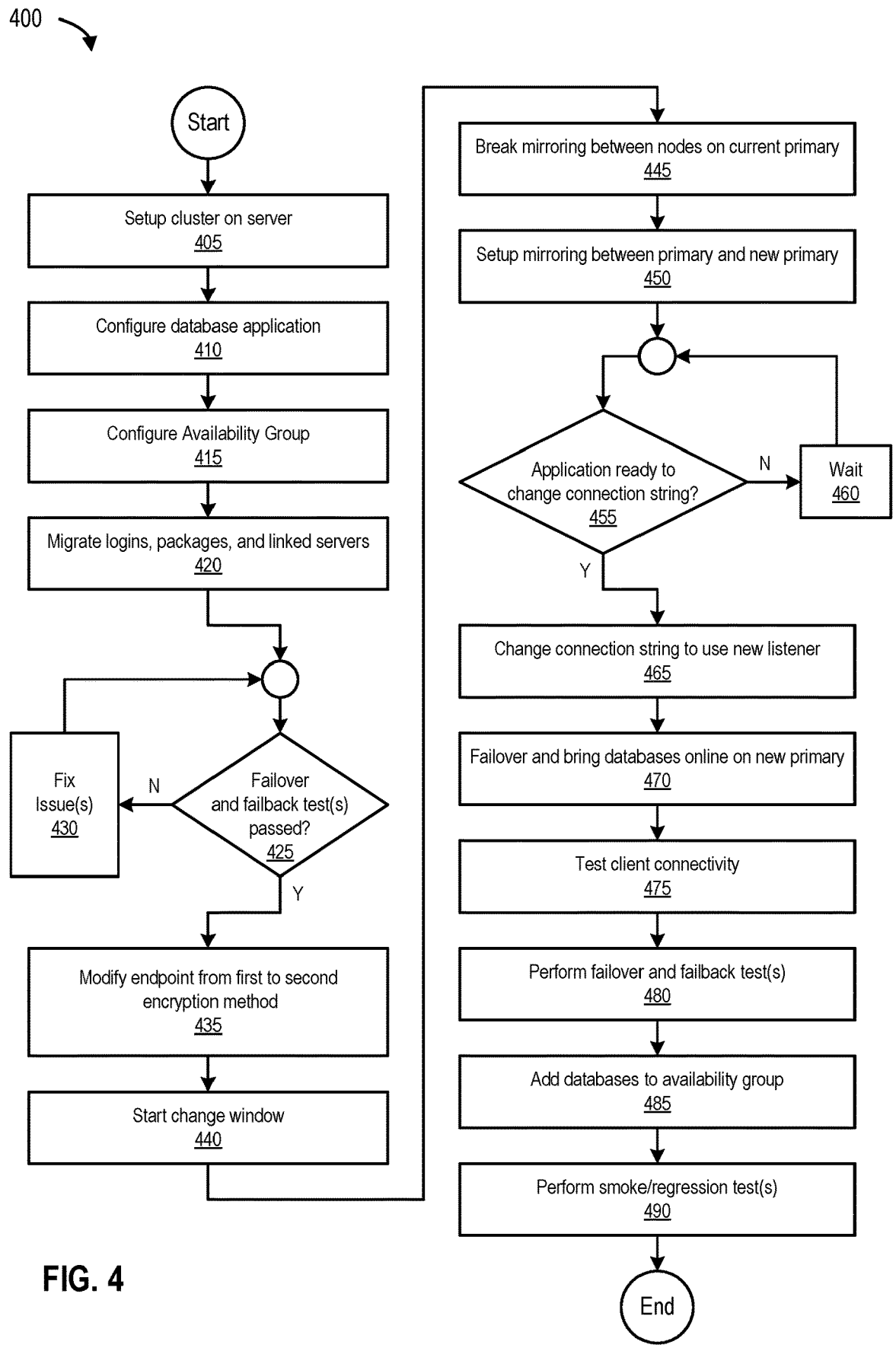
FIG. 4 is a flowchart 400 that illustrates a process for migrating databases between database servers in HADR computing environments, according to one embodiment of the present disclosure.

FIG. 4 is a flowchart 400 that illustrates a process for migrating databases between database servers in HADR computing environments, according to one embodiment. The process begins at 405 by setting up a cluster on a server. At 410, a database application is configured (e.g., new database application 350). At 415, an availability group is configured (e.g., an AlwaysOn availability group), and at 420, logins, packages, and linked servers are migrated. At 425, it is determined whether failover and failback tests have been passed. If failover and failback tests have not been passed, (technical) issues are fixed at 430. However, if failover and failback tests have been passed, the process, at 435, modifies an endpoint (e.g., Hadr_endpoint) from a first to second encryption method (e.g., AES to AES RC4, and the like). At 440, the process starts the (migration) change window.

At 445, the process breaks mirroring between nodes on a current primary (e.g., between the current primary and secondary (database) servers such as old primary server 205 and old secondary server 210 using mirroring engine 145(1) and/or 145(2))). At 450, the process sets up mirroring between the primary and a new primary server (e.g., between old primary server 205 and new primary server 215 using mirroring engine 145(1) and/or 145(3))). At 455, the process determines if the application (e.g., application 130(1)) is ready to change the connection string (e.g., based on whether the application is still accessing old database 135 on old primary server 205, and the like). If the application load has not yet stopped, the process, at 460, waits. However, if the application load has stopped and the application is ready to change the connection string, the process, at 465, changes the connection string to use a new listener (e.g., a listener associated with new primary server 215).

At 470, the process fails over and brings databases online on the new primary (e.g., on new primary server 215 (using new database application 350)), and at 475, tests client connectivity (e.g., the connection string's connectivity to the new listener of new primary server 215). At 480, the process performs failover and failback tests, and at 485, adds the databases to the availability group. The process ends at 490 by performing smoke/regression tests.

Figure 5:
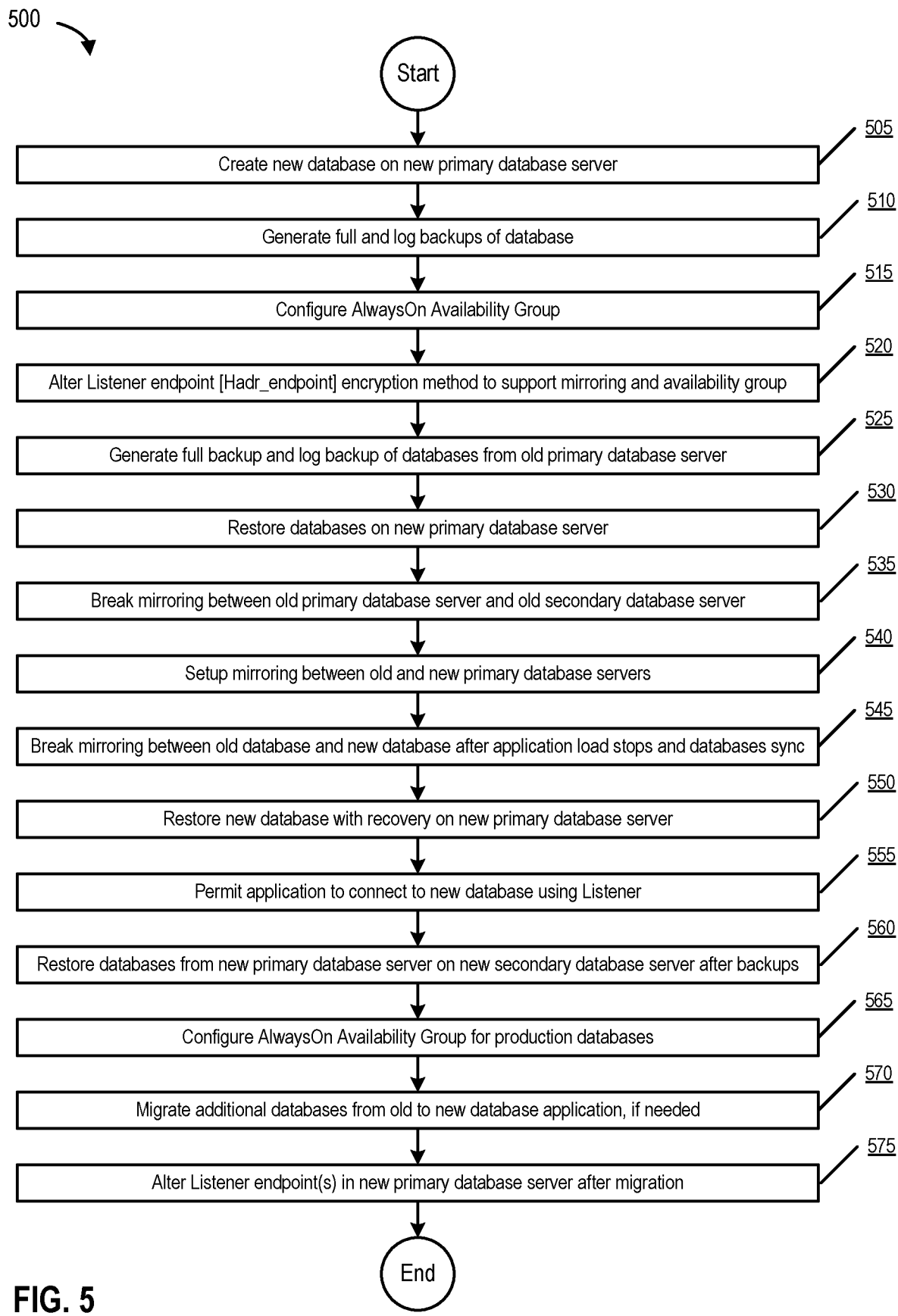
FIG. 5 is a flowchart 500 that illustrates a process for altering a listener endpoint to support multiple encryption methods to facilitate database migration in HADR computing environments, according to one embodiment of the present disclosure.

FIG. 5 is a flowchart 500 that illustrates a process for altering a listener endpoint to support multiple encryption methods to facilitate database migration in HADR computing environments, according to one embodiment. The process begins at 505 by creating a new database on a new primary database server (e.g., new database 140 on new primary database server 120 as shown in FIG. 1). At 510, the process generates full and log backups of the database (e.g., of data 305(1) and log 310(1) as shown in FIG. 3B). At 515, the process configures AlwaysOn availability group (e.g., using AlwaysOn engine 150(1)).

At 520, the process alters and/or modifies the listener endpoint [e.g., Hadr_endpoint] encryption method to support mirroring (e.g., RC4, and the like) and availability group (e.g., AES, and the like). At 525, the process generates full backups and log backups of databases from an old primary database server (e.g., old primary database server 110 or old primary server 205), and at 530, restores those databases on a new primary database server (e.g., new primary database server 120 or new primary server 215).

At 535, the process breaks mirroring between the old primary database server and the old secondary database server (e.g., between primary database server 110 and old secondary database server 115, or between old primary server 205 and old secondary server 210). At 540, the process sets up and/or configures mirroring between the old and new primary database servers (e.g., between old primary server 205 and new primary server 215). At 545, the process breaks mirroring between an old database and a new database (e.g., between old database application 345 and new database application 350 after application load(s) stop and databases synchronize). At 550, the process restores the new database with recovery on the new primary database server (e.g., new database 125).

At 555, the process permits the application to connect to the new database using listener, and at 560, restores databases from the new primary database server on the new secondary database server (e.g., new secondary server 220) after backups have been generated. At 565, the process configures AlwaysOn availability group for production databases, and at 570, migrates additional databases from the old to new database application, if needed. The process ends at 575 by altering listener endpoint(s) in the new primary database after migration.

Figure 6:
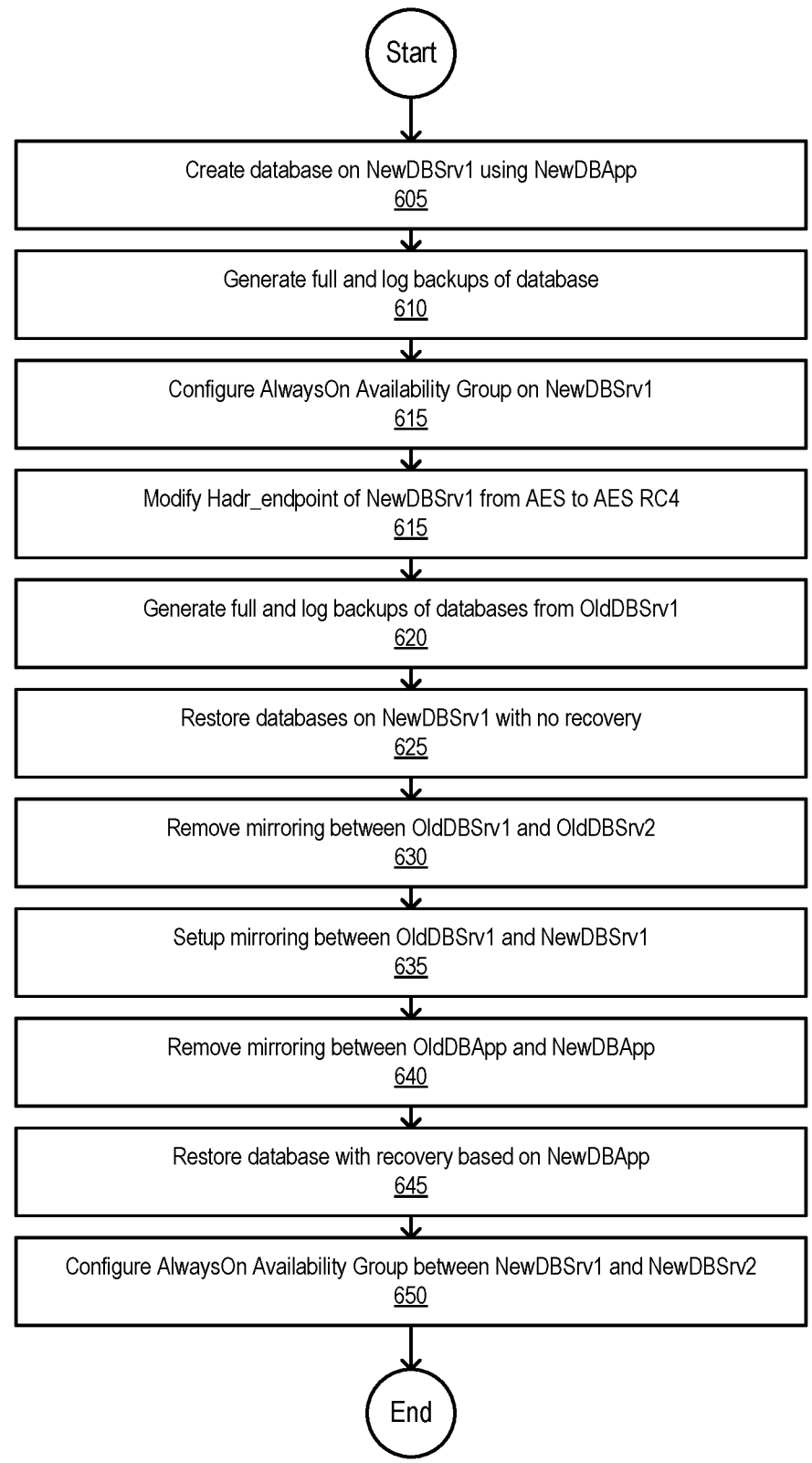
FIG. 6 is a flowchart 600 that illustrates a process for restoring a database in HADR computing environments, according to one embodiment of the present disclosure.

FIG. 6 is a flowchart 600 that illustrates a process for restoring a database in HADR computing environments, according to one embodiment. The process begins at 605 by creating a database on a NewDBSrv1 (e.g., new database 125 on new primary server 215) using a NewDBApp (e.g., new database application 350). At 610, the process generates full and log backups of the database(s). At 615, the process configures AlwaysOn availability group on the NewDBSrv1. At 620, the process creates full and log backups of databases from OldDBSrv1 (e.g., from old primary server 205). At 625, the process restores the databases on NewDBSrv1 (e.g., new primary server 215) with no recovery.

At 630, the process removes or breaks mirroring between OldDBSrv1 and OldDBSrv2 (e.g., between old primary server 205 and old secondary server 210 which contain mirrored databases), and at 635, sets up and/or configures mirroring between OldDBSrv1 and NewDBSrv2 (e.g., between old primary server 205 and new primary server 215). At 640, the process removes or breaks mirroring between OldDBApp (e.g., old database application 345) and NewDBApp (e.g., new database application 350). The process ends at 650 by configuring AlwaysOn availability group between NewDBSrv1 (e.g., new primary server 215) and NewDBSrv2 (e.g., new secondary server 220).

Figure 7:
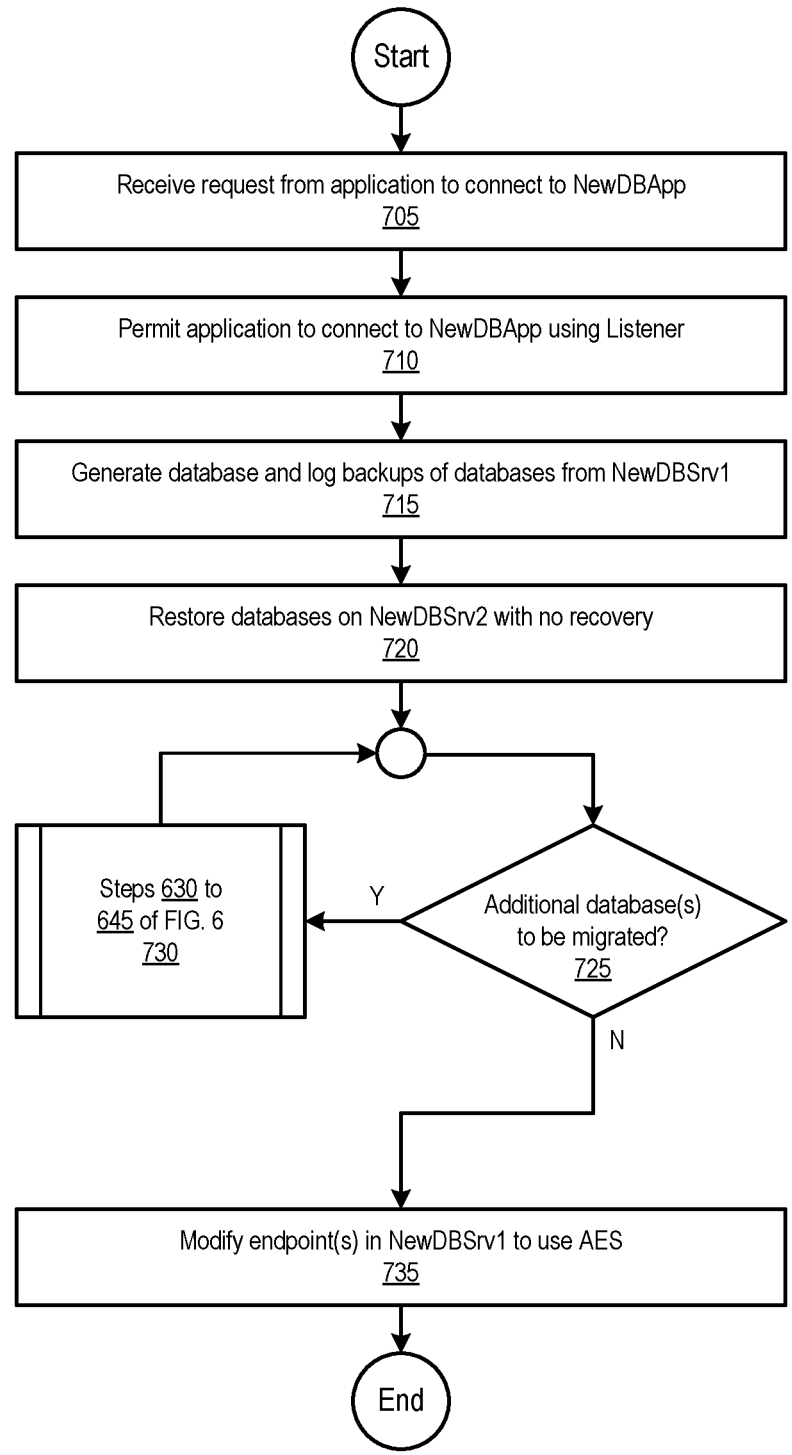
FIG. 7 is a flowchart 700 that illustrates a process for restoring additional databases in HADR computing environments, according to one embodiment of the present disclosure.

FIG. 7 is a flowchart 700 that illustrates a process for restoring additional databases in HADR computing environments, according to one embodiment. The process begins at 705 by receiving a request from an application to connect to a NewDBApp (e.g., new database application 350). At 710, the process permits the application to connect to the NewDBApp using listener. At 715, the process generates database and log backups of databases from NewDBSrv1 (e.g., new primary server 215). At 720, the process restores databases on NewDBSrv2 (e.g., new secondary server 220) with no recovery. At 725, the process determines whether there are additional databases to be migrated. If there are additional databases to be migrated, the process, at 730, performs steps 630 through 645 of FIG. 6. If there are no additional databases to be migrated, the process ends at 735 by modifying endpoint(s) in NewDBSrv1 (e.g., new primary server 215) to use AES.

Example Computing Environment

Figure 8:
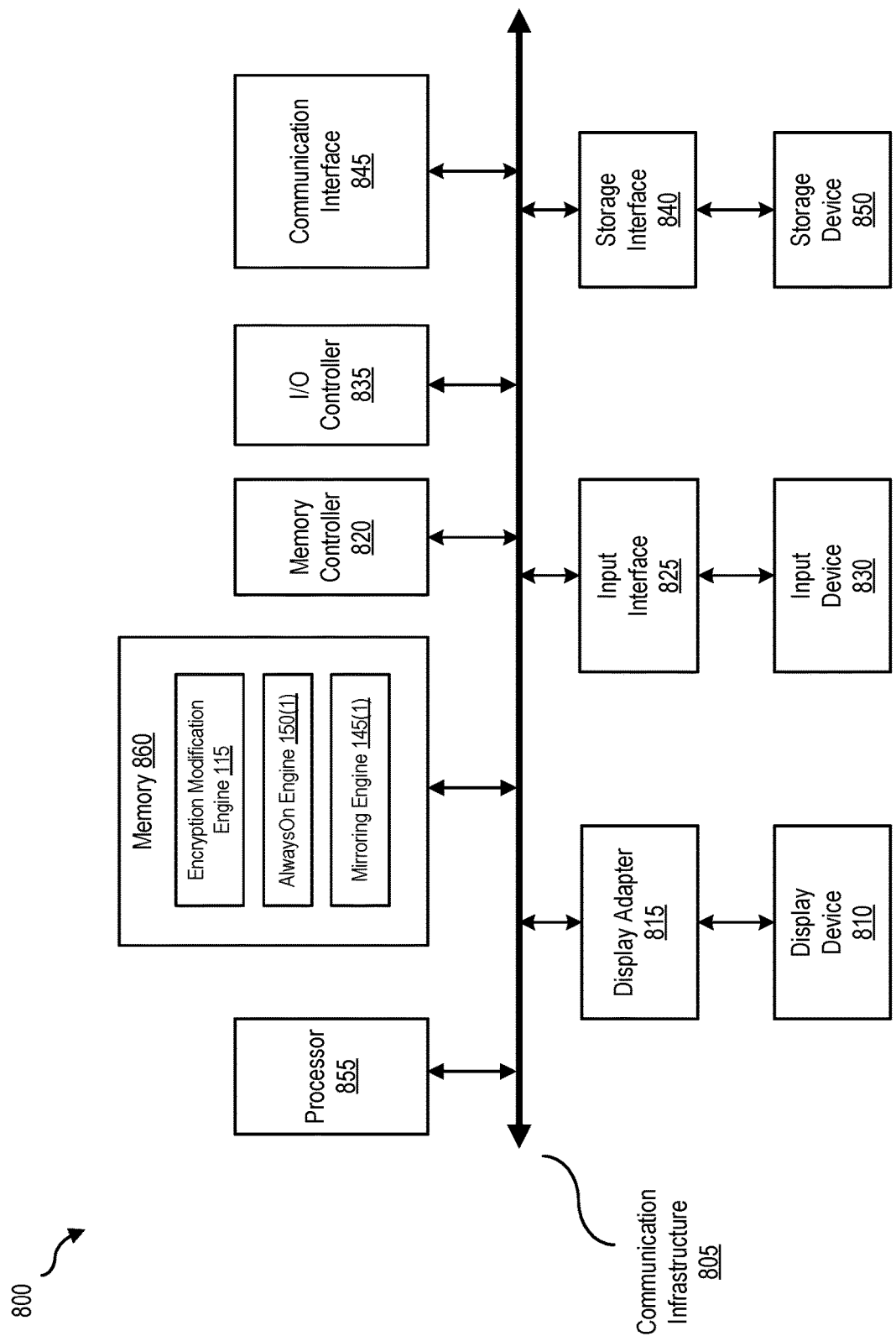
FIG. 8 is a block diagram 800 of a computing system, illustrating how an encryption modification engine, an AlwaysOn engine, and/or a mirroring engine can be implemented in software, according to one embodiment of the present disclosure.

FIG. 8 is a block diagram 800 of a computing system, illustrating how encryption modification engine 160, alwaysON engine 150(1), and/or mirroring engine 145(1) can be implemented in software, according to one embodiment. Computing system 800 can include old primary database server 110, new primary database server 120, old secondary database server 115, and/or new secondary database server 125 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes encryption modification engine 160, alwaysON engine 150(1), and/or mirroring engine 145(1), computing system 800 becomes a special purpose computing device that is configured to optimize database migration in high availability and disaster recovery computing environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing encryption modification engine 160, alwaysON engine 150(1), and/or mirroring engine 145(1) may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850, old primary database server 110, new primary database server 120, old secondary database server 115, and/or new secondary database server 125. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
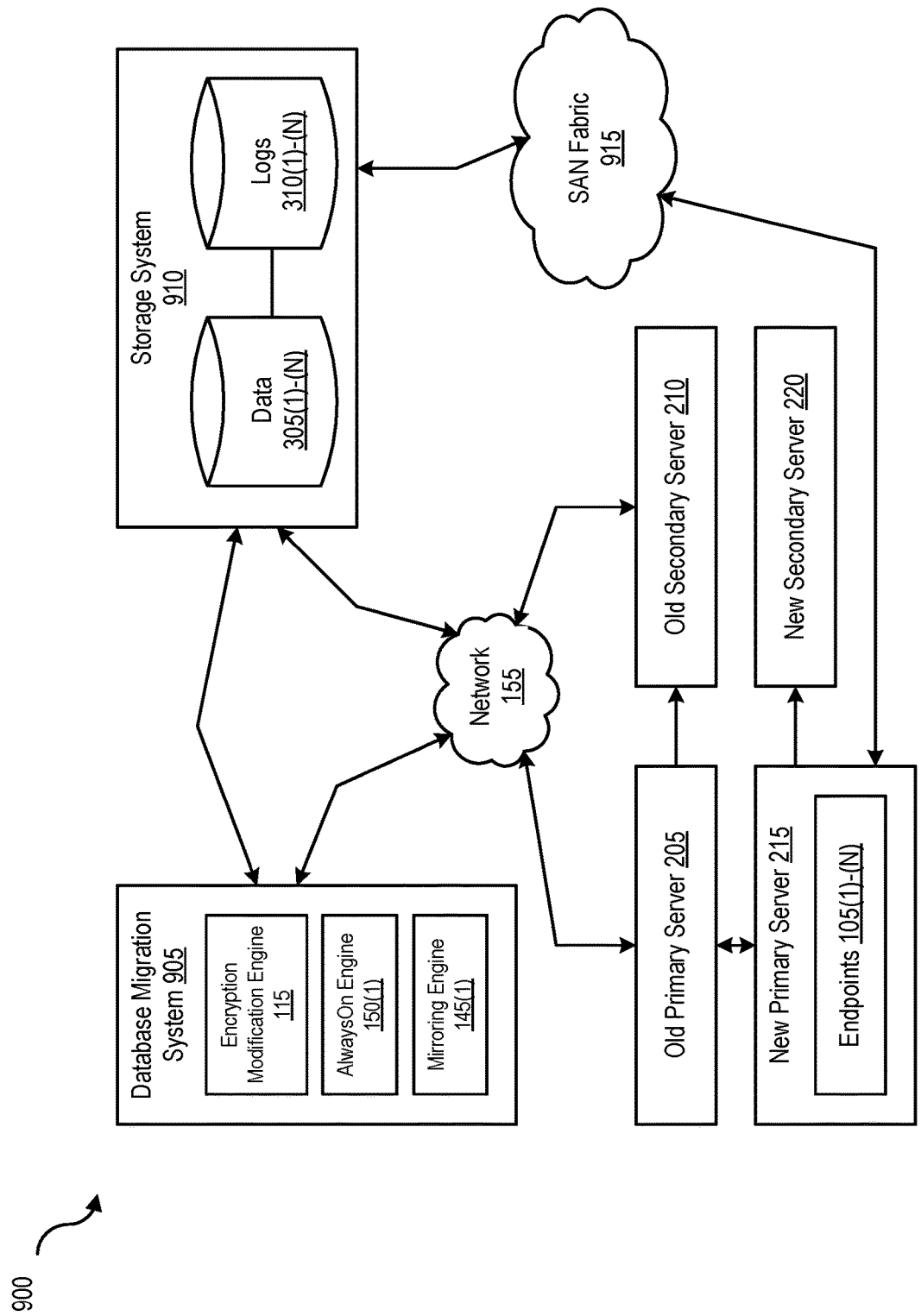
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with old primary database server 110, new primary database server 120, old secondary database server 115, and/or new secondary database server 125 using Network File System (NFS), Server Message Block (SMB), or Common Internet File System (CIFS). Network 155 generally represents any type or form of computer network or architecture capable of facilitating communication between old primary database server 110, new primary database server 120, old secondary database server 115, endpoints 105(1)-(N), and/or new secondary database server 125.

In certain embodiments, a communication interface, such as communication interface 845 in FIG. 8, may be used to provide connectivity between old primary database server 110, new primary database server 120, old secondary database server 115, endpoints 105(1)-(N), database migration system 905, storage system 910, new secondary database server 125, and/or any of the computing systems and/or computing devices illustrated in FIGS. 1, 2, 3A, and 3B, and network 155. The embodiments described and/or illustrated herein are not limited to the Internet or any particular network-based environment.

In some embodiments, network 155 can be a Storage Area Network (SAN). In other embodiments, encryption modification engine 160, alwaysON engine 150(1), and/or mirroring engine 145(1) may be part of old primary database server 110, new primary database server 120, old secondary database server 115, endpoints 105(1)-(N), and/or new secondary database server 125, or may be separate. If separate, old primary database server 110, new primary database server 120, old secondary database server 115, endpoints 105(1)-(N), and/or new secondary database server 125 may be communicatively coupled via network 155.

In one embodiment, all or a portion of one or more of the disclosed embodiments may be encoded as a computer program and loaded onto and executed by old primary database server 110, new primary database server 120, old secondary database server 115, endpoints 105(1)-(N), and/or new secondary database server 125, and/or database migration system 905, or any combination thereof. All or a portion of one or more of the embodiments disclosed herein may also be encoded as a computer program, stored on database migration system 905, old primary database server 110, new primary database server 120, old secondary database server 115, endpoints 105(1)-(N), new secondary database server 125, and/or storage system 910, and distributed over network 155.

In some examples, all or a portion of database migration system 905, old primary database server 110, new primary database server 120, old secondary database server 115, endpoints 105(1)-(N), and/or new secondary database server 125 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, encryption modification engine 160, alwaysON engine 150(1), and/or mirroring engine 145(1) may transform the behavior of database migration system 905, old primary database server 110, new primary database server 120, old secondary database server 115, endpoints 105(1)-(N), and/or new secondary database server 125 in order to cause database migration system 905, old primary database server 110, new primary database server 120, old secondary database server 115, endpoints 105(1)-(N), and/or new secondary database server 125 to optimize database migration in high availability and disaster recovery computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:

operating an old primary database server and an old secondary database server in a mirroring configuration to mirror a database on the old primary database server to the old secondary database server, wherein the database on the old secondary database server that is mirrored from the old primary database server is not readable while accessible from the old primary database server, wherein the mirroring configuration employs a first encryption method to connect the old primary database server with the old secondary database server, the old primary database server and the old secondary database server operate exterior to a high availability group cluster as a result of the mirroring configuration;

providing a new primary database server having an endpoint, wherein the endpoint is compatible with the first encryption method and a second encryption method, wherein the new primary database server is configured for inclusion in the high availability group cluster, wherein the second encryption method is an encryption method employed in the high availability group cluster and is different from the first encryption method;

disabling database mirroring between the old primary database server and the old secondary database server;

configuring database mirroring between the old primary database server and the new primary database server using the endpoint while the endpoint is configured to connect with the old primary database server using the first encryption method;

performing mirroring of the database between the old primary database server and a database of the new primary database server while the endpoint is configured to connect to the old primary database server using the first encryption method, wherein the mirroring of the database between the old primary database server and the database of the new primary database server occurs exterior to the high availability group cluster, the new primary database server operates as a non-readable secondary database server while performing the mirroring;

performing a failover operation upon synchronization of the database between the old primary database server and the database of the new primary database server, wherein the failover operation comprises executing migration operations to enable functioning of the database at the new primary database server;

disabling the database mirroring between the old primary database server and the new primary database server; and enabling the new primary database server and the database of the new primary database server for operation in the high availability group cluster, wherein the endpoint of the new primary database server is operable for connection with other servers in the high availability group cluster using the second encryption method, wherein the high availability group cluster is capable of concurrently using one or more readable secondary databases.

2. The computer-implemented method of claim 1, wherein the second encryption method is an Advanced Encryption Standard (AES), and the first encryption method is a Rivest Cipher 4 (RC4).

3. The computer-implemented method of claim 1, further comprising:
communicating a copy of a replica of the database from the new primary database server to a new secondary database server in the high availability group cluster, wherein the new secondary database server and new primary database server are configured for communication using the second encryption method, and wherein the replica of the database is generated pursuant to mirroring of the old primary database server to the new primary database server.

4. The computer-implemented method of claim 3, further comprising:
determining that the endpoint indicates the first encryption method and the second encryption method.

5. The computer-implemented method of claim 3, further comprising:
generating a full backup of the database and corresponding database logs from the new primary database server; and
restoring the full backup of the database and the corresponding database logs on the new secondary database server.

6. The computer-implemented method of claim 1, further comprising:
generating a full backup of the database and at least one log backup for the database on the old primary database server; and
restoring the full backup of the database and the log backup on the new primary database server to facilitate the database mirroring.

7. The computer-implemented method of claim 1, further comprising:
as part of the migration operations, changing a connection string of an application from the old primary database server to the new primary database server so as to require a single connection string change.

8. A non-transitory computer readable storage medium comprising program instructions executable to:
operate an old primary database server and an old secondary database server in a mirroring configuration to mirror a database from the old primary database server to the old secondary database server, wherein the database on the old secondary database server that is mirrored from the old primary database server is not readable while accessible from the old primary database server, wherein the mirroring configuration employs employing a first encryption method to connect the old primary database server with the old secondary database server, the old primary database server and the old secondary database server operate exterior to a high availability group cluster as a result of the mirroring configuration;
provide a new primary database server having an endpoint, wherein the endpoint is compatible with the first encryption method and a second encryption method, wherein the new primary database server is configured for inclusion in the high availability group cluster, wherein the second encryption method is an encryption method employed in the high availability group cluster and is different from the first encryption method;
disable database mirroring between the old primary database server and the old secondary database server;
configure database mirroring between the old primary database server and the new primary database server using the endpoint while the endpoint is configured to connect with the old primary database server using the first encryption method;
perform mirroring of the database between the old primary database server and a database of the new primary database server while the endpoint is configured to connect to the old primary database server using the first encryption method, wherein the mirroring of the database between the old primary database server and the database of the new primary database server occurs exterior to the high availability group cluster, the new primary database server operates as a non-readable secondary database server while performing the mirroring;
perform a failover operation upon synchronization of the database between the old primary database server and the database of the new primary database server, wherein the failover operation comprises executing migration operations to enable functioning of the database at the new primary database server;
disable the database mirroring between the old primary database server and the new primary database server; and
enable the new primary database server and the database of the new primary database server for operation in the high availability group cluster, wherein the endpoint of the new primary database server is operable for connection with other servers in the high availability group cluster using the second encryption method, wherein the high availability group cluster is capable of concurrently using one or more readable secondary databases.

9. The non-transitory computer readable storage medium of claim 8, wherein the second encryption method is an Advanced Encryption Standard (AES), and the first encryption method is a Rivest Cipher 4 (RC4).

10. The non-transitory computer readable storage medium of claim 8, wherein the instructions are further executable to:
configure a new secondary database server for connection with the new primary database server in the high availability group cluster, wherein the new secondary database server and new primary database server are configured for connection using the second encryption method.

11. The non-transitory computer readable storage medium of claim 8, wherein the instructions are further executable to:
generate a full backup of the database and corresponding database logs from the new primary database server;
restore the full backup of the database and the corresponding database logs on a new secondary database server;
configure a high availability group cluster using the new primary database server and the new secondary database server; and
configure one or more endpoints in the new primary database server to use both the first encryption method and the second encryption method to facilitate the database mirroring and communication with other servers in the high availability group cluster.

12. A system comprising:
a plurality of networked servers, wherein each of the plurality of networked servers includes one or more processors, and a memory coupled to the one or more processors, wherein the memory stores program instructions executable by the one or more processors to:

operate an old primary database server and an old secondary database server in a mirroring configuration to mirror a database from the old primary database server to the old secondary database server, wherein the database on the old secondary database server that is mirrored from the old primary database server is not readable while accessible from the old primary database server, wherein the mirroring configuration employs employing a first encryption method to connect the old primary database server with the old secondary database server;

provide a new primary database server having an endpoint, wherein the endpoint is compatible with the first encryption method and a second encryption method, wherein the new primary database server is configured for inclusion in the high availability group cluster, wherein the second encryption method is an encryption method employed in the high availability group cluster and is different from the first encryption method;

disable database mirroring between an old primary database server and an old secondary database server;

configure database mirroring between the old primary database server and the new primary database server using the endpoint while the endpoint is configured to connect with the old primary database server using the first encryption method;

perform mirroring of the database between the old primary database server and a database of the new primary database server while the endpoint is configured to connect to the old primary database server using the first encryption method, wherein the mirroring of the database between the old primary database server and the database of the new primary database server occurs exterior to the high availability group cluster;

perform a failover operation upon synchronization of the database between the old primary database server and the database of the new primary database server, wherein the failover operation comprises executing migration operations to enable functioning of the database to the new primary database server;

disable the database mirroring between the old primary database server and the new primary database server; and enable the new primary database server and the database of the new primary database server for operation in the high availability group cluster, wherein the endpoint of the new primary database server is operable for connection with other servers in the high availability group cluster using the second encryption method, wherein the high availability group cluster is capable of concurrently using one or more readable secondary databases.

13. The system of claim 12, wherein
the second encryption method is an Advanced Encryption Standard (AES), and
the first encryption method is a Rivest Cipher 4 (RC4).

14. The system of claim 12, wherein the instructions are further executable to:
configure a new secondary database server for connection with the new primary database server in the high availability group cluster, wherein the new secondary database server and new primary database server are configured for connection using the second encryption method.

15. The system of claim 12, wherein the instructions are further executable to:
generate a full backup of the database and corresponding database logs from the new primary database server;
restore the database and the corresponding database logs on a new secondary database server;
configure a high availability group cluster using the new primary database server and the new secondary database server; and
configure one or more endpoints in the new primary database server to use both the first encryption method and the second encryption method to facilitate the database mirroring and communicate with other servers in the high availability group cluster.

* * * * *